(12) United States Patent
Brull et al.

(10) Patent No.: US 9,127,698 B1
(45) Date of Patent: Sep. 8, 2015

(54) DECK AND PATIO ANCHORING DEVICE

(76) Inventors: Richard Brull, North Kansas City, MO (US); Brian Allen Hager, Lenexa, KS (US); Robert Michael Coulston, Kansas City, MO (US); Curtis Robert McMillan, Kansas City, MO (US); Stanton Wayne Fernald, Gardner, KS (US); Dale J. Crook, Olathe, KS (US)

(*) Notice: Subject to any disclaimer, the term of this patent is extended or adjusted under 35 U.S.C. 154(b) by 102 days.

(21) Appl. No.: 13/550,450

(22) Filed: Jul. 16, 2012

Related U.S. Application Data (60) Provisional application No. 61/508,886, filed on Jul. 18, 2011.

(51) Int. Cl.
*A44B 1/04* (2006.01)
*F16B 1/00* (2006.01)
*F16B 13/08* (2006.01)

(52) U.S. Cl.
CPC ............... *F16B 1/00* (2013.01); *F16B 13/0808* (2013.01); *Y10T 24/42* (2015.01); *Y10T 24/4764* (2015.01)

(58) Field of Classification Search
CPC ...... B60P 7/0807; B60P 7/0838; F16B 45/02; F16B 45/025
USPC ........ 24/265 R, 458, 453, 114.3, 102 T, 16 R, 24/17 AP, 902; 248/499–505; 410/101, 410/102
See application file for complete search history.

(56) References Cited

U.S. PATENT DOCUMENTS

| | | | | | |
|---|---|---|---|---|---|
| 3,494,587 | A | * | 2/1970 | Kuhn | 248/499 |
| 4,573,844 | A | * | 3/1986 | Smith | 411/340 |
| 4,630,982 | A | * | 12/1986 | Fenner | 410/102 |
| 4,657,461 | A | * | 4/1987 | Smith | 411/340 |
| 6,280,128 | B1 | * | 8/2001 | Schrader | 410/97 |
| 6,308,383 | B1 | * | 10/2001 | Schrader | 24/265 H |
| 6,398,447 | B1 | | 6/2002 | Pearl | |
| 6,935,602 | B2 | | 8/2005 | Hardie | |
| 6,994,501 | B2 | | 2/2006 | Smetz | |
| 7,134,819 | B2 | | 11/2006 | Bullock | |
| 7,607,632 | B2 | * | 10/2009 | Droche et al. | 248/500 |
| 8,075,232 | B2 | * | 12/2011 | Le | 410/106 |
| 8,353,653 | B2 | * | 1/2013 | Guthrie et al. | 411/344 |
| 8,567,151 | B2 | * | 10/2013 | Walther | 52/712 |
| 2007/0292229 | A1 | * | 12/2007 | Andrew et al. | 410/101 |
| 2011/0079700 | A1 | * | 4/2011 | Hilderbrand | 248/499 |
| 2011/0162171 | A1 | * | 7/2011 | Gmeilbauer | 24/16 R |
| 2013/0298381 | A1 | * | 11/2013 | Owen | 29/525.01 |

* cited by examiner

*Primary Examiner* — Victor Batson
*Assistant Examiner* — Matthew Sullivan
(74) *Attorney, Agent, or Firm* — Law Office of Mark Brown, LLC; Christopher M. DeBacker; Mark E. Brown (57) ABSTRACT

An anchoring device for a deck or dock or similar structure comprising an anchoring member, a holding plate, and a fastener. First, the fastener is threaded through the holding plate and ring assembly. Then, the holding plate and fastener is inserted through an opening in the support structure, e.g., a narrow slot between the boards on the deck or patio, and, finally, the fastener is pulled outward in relation to the anchoring member to securely affix the anchoring member and the holding plate against two opposing sides of the support structure.

9 Claims, 12 Drawing Sheets

DECK AND PATIO ANCHORING DEVICE

CROSS-REFERENCE TO RELATED APPLICATIONS

This application is based on and claims priority to U.S. Provisional Application Ser. No. 61/508,886, filed on Jul. 18, 2011, which is hereby incorporated herein by reference.

STATEMENT REGARDING FEDERALLY SPONSORED RESEARCH OR DEVELOPMENT

Not applicable.

BACKGROUND OF THE INVENTION

Field of the Invention

The present invention relates generally to an anchoring device for a deck, dock, patio, or similar structure. More particularly, the invention encompasses an easily mounted, easily removed, and reusable device for securing items to any support structure having an opening, such as narrow space between the boards on the deck or patio, to accommodate the anchoring device.

BRIEF SUMMARY OF THE INVENTION

This invention is a novel device that allows for easy anchoring of items to a deck, dock, or other support structure. The anchoring device of the present invention comprises an anchoring member, a holding plate, and a fastener. To install the device, the user first threads the fastener through the holding plate and ring assembly. The user then merely inserts the holding plate and fastener through an opening in the support structure, such as a narrow slot between the boards on the deck or patio, and pulls fastener upward to urge the base plate and anchoring member against two opposing sides of the support structure. Finally, the user cuts off the excess length of fastener above the retaining clip.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF PREFERRED EMBODIMENT

Figure 1:
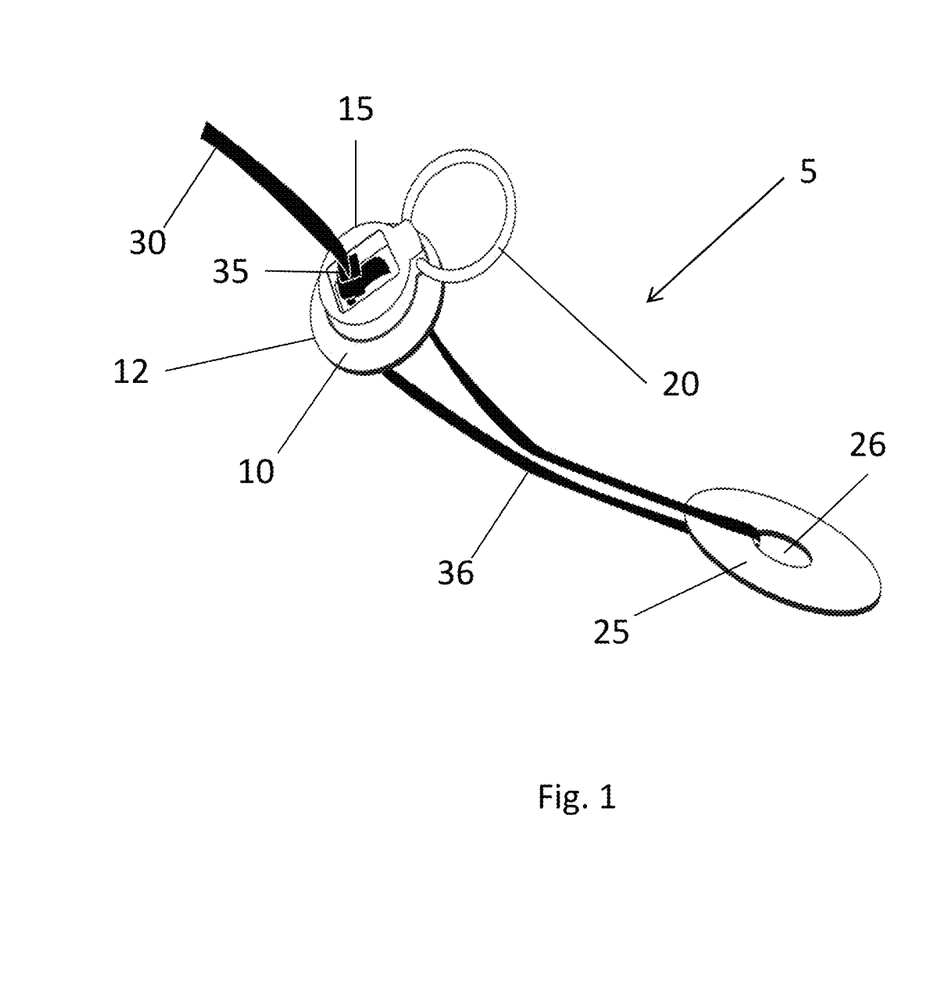
FIG. 1 is a perspective view of an embodiment of deck tie-down assembly.
Figure 2:
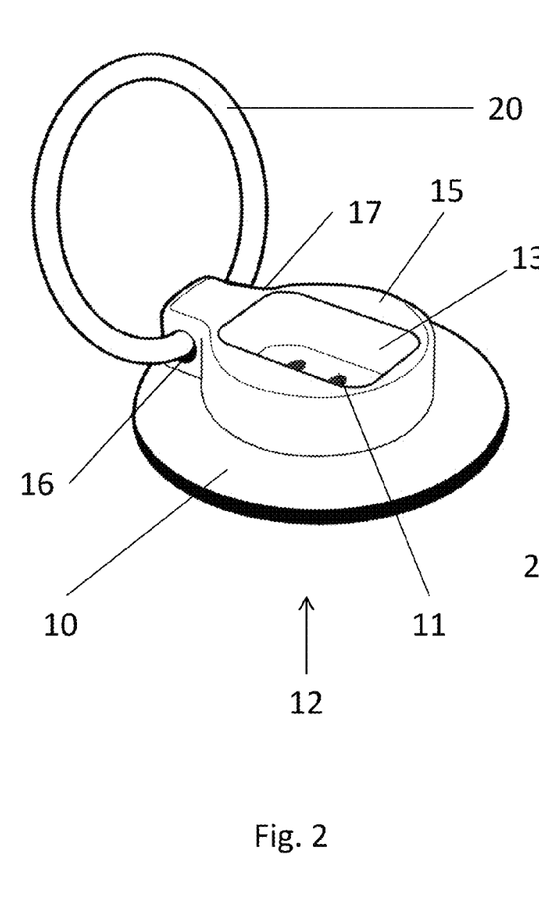
FIG. 2 is a perspective view of anchoring member with raised ring.
Figure 3:
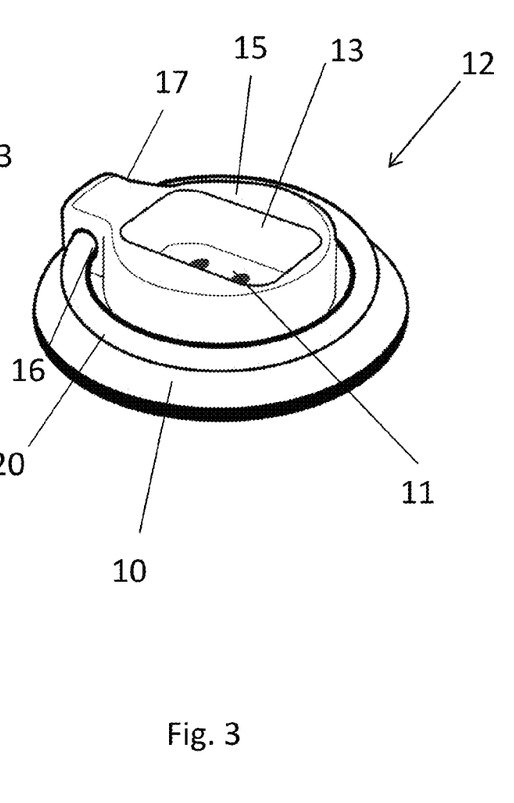
FIG. 3 is a perspective view of anchoring member with lowered ring.

Referring more particularly to the drawings, FIG. 1 illustrates one embodiment of deck tie-down assembly 5 comprising an anchoring member 12, a holding plate 25, and a flexible fastener 30. As shown in FIGS. 2 and 3, anchoring member 12 comprises a base plate 10, a ring mount 15, at least one opening 11 within a recessed area 13 of ring mount 15, and a ring 20.

Base plate 10 is preferably round with a diameter larger than the opening in the support structure to which deck tie-down assembly 5 is to be attached. Ring mount 15 is integrally connected to the top surface of base plate 10 and includes a recessed area 13 and a ring-receiving member 17 adapted to pivotably secure ring 20. In a preferred embodiment, ring-receiving member 17 comprises two opposing apertures 16, 17 for pivotably receiving ring 20.

Figure 4:
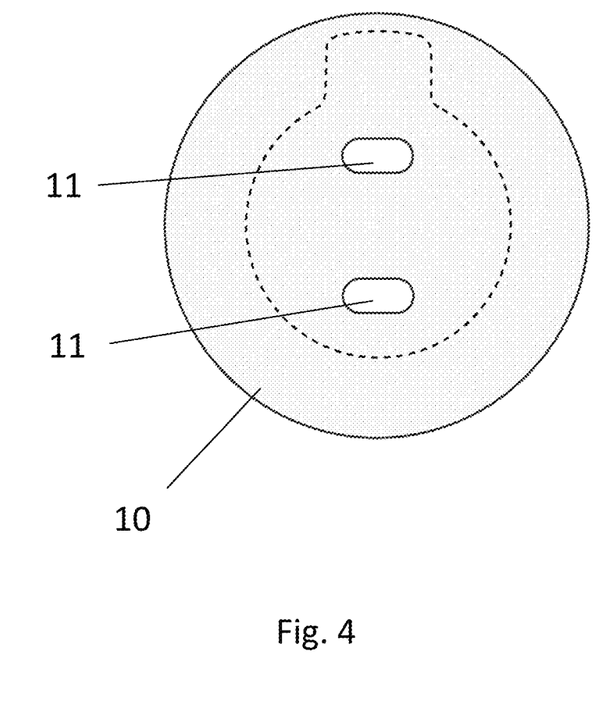
FIG. 4 is a bottom planar view of anchoring member.
Figure 5:
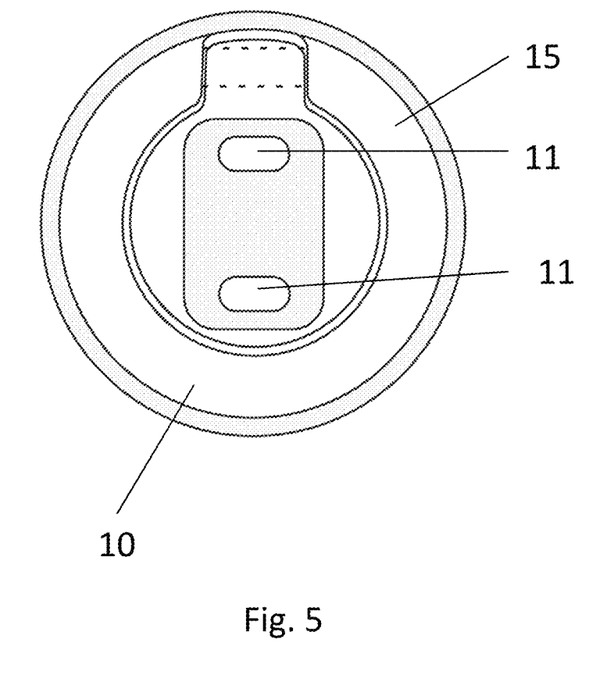
FIG. 5 is a top planar view of the anchoring member.
Figure 6:
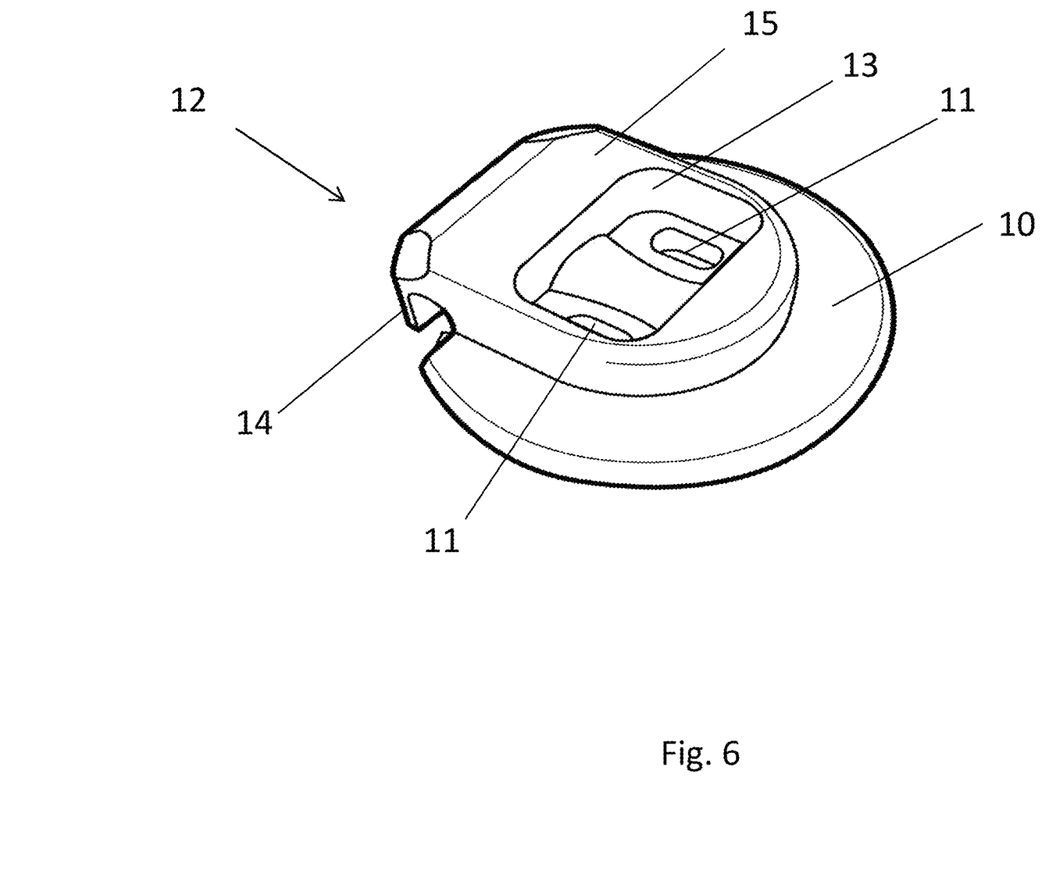
FIG. 6 is a perspective view of an alternative embodiment of anchoring member without ring.
Figure 7:
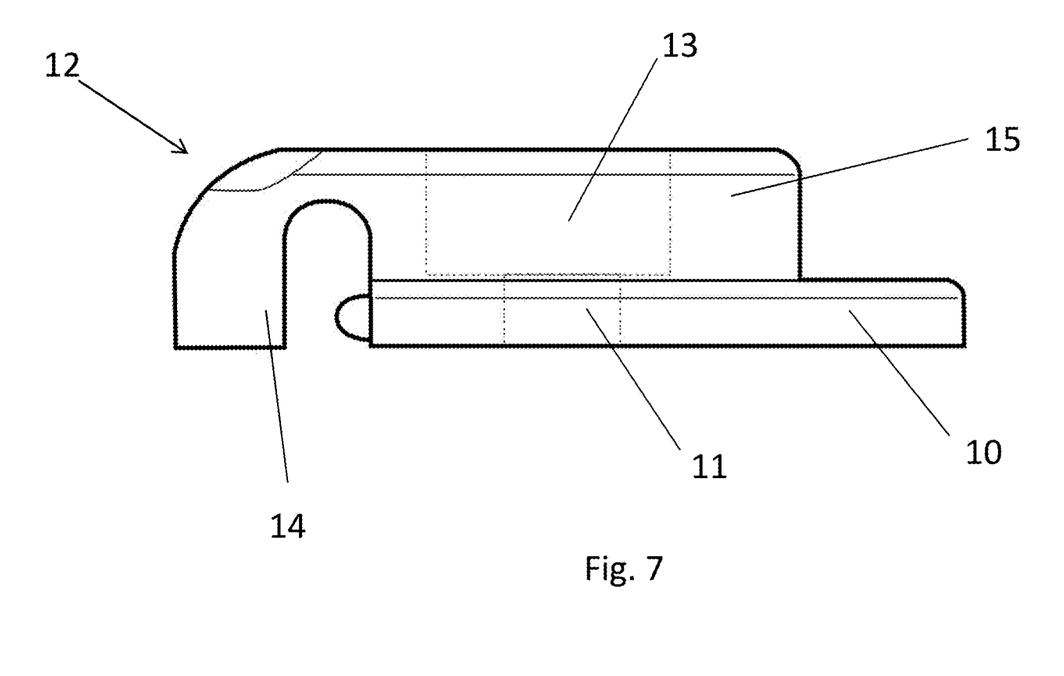
FIG. 7 is a side view of an alternative embodiment of anchoring member without ring.
Figure 8:
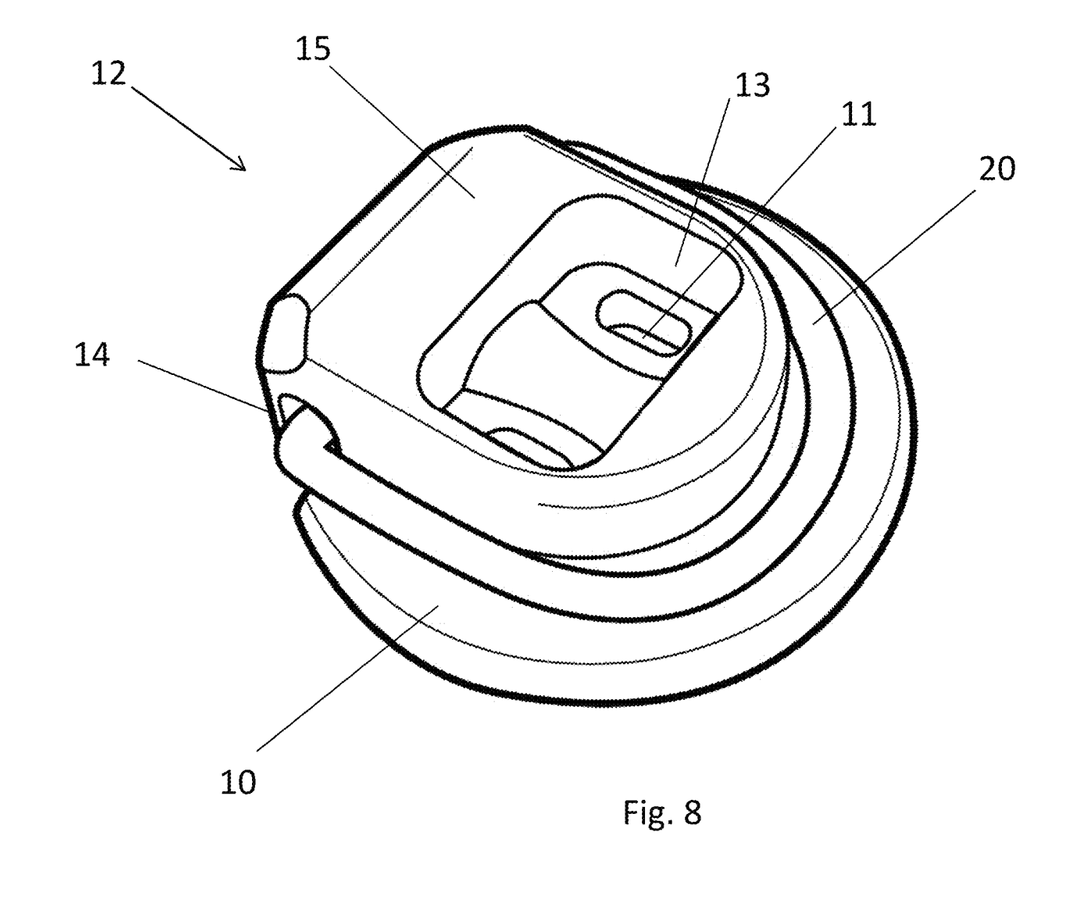
FIG. 8 is a perspective view of an alternative embodiment of anchoring member.
Figure 9:
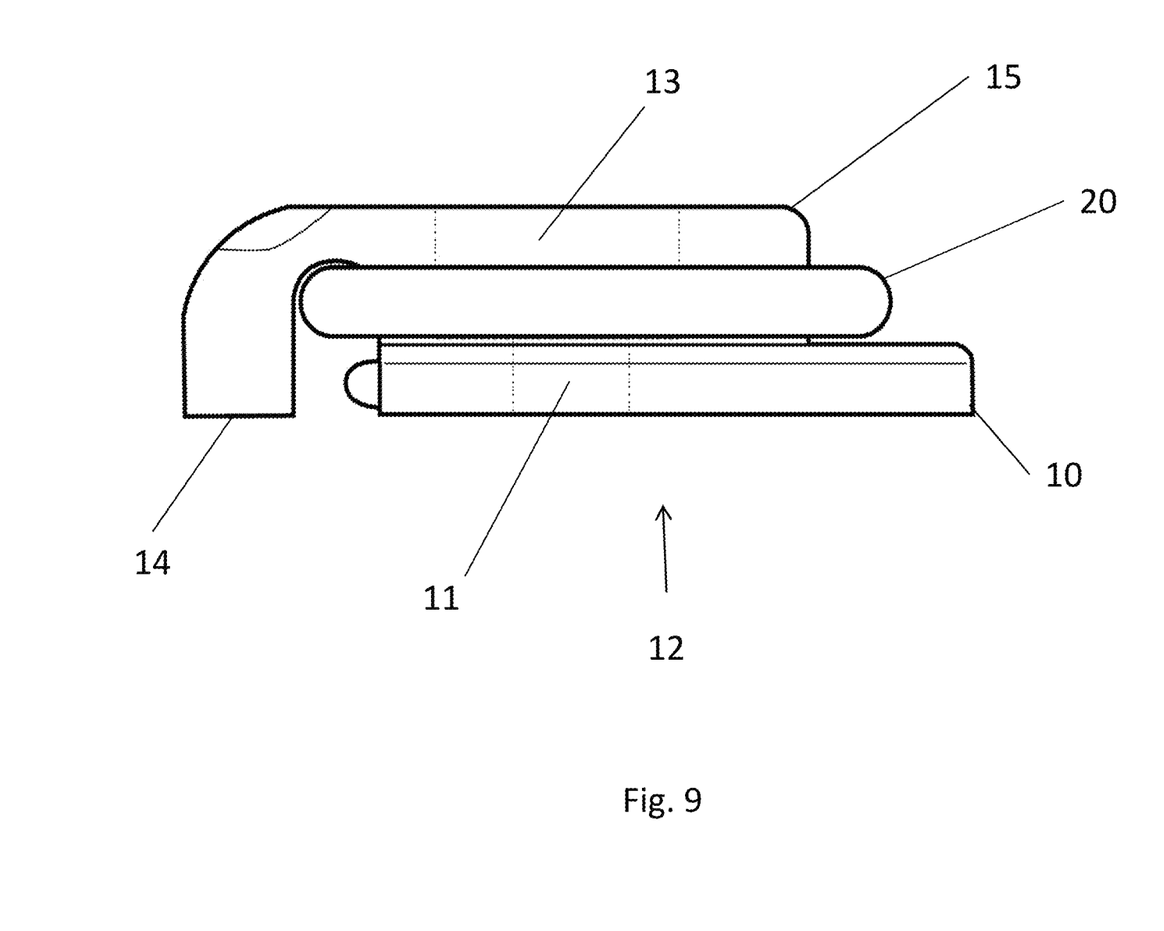
FIG. 9 is a side view of an alternative embodiment of anchoring member.

Preferably the outer wall circumference of ring mount 15 correspond to the inner circumference of ring 20, such that ring 20 in its lowered position surrounds ring mount 15 and is adjacent base plate 10. In one embodiment, as shown in FIG. 3, base plate 10, ring 20, and ring mount 15 are substantially circular, wherein inner diameter of ring 20 is larger than diameter of ring mount 15, and wherein outer diameter of ring 20 is smaller than the diameter of base plate 10. In other embodiments ring 20 may not be circular but, as shown in FIG. 4, could be in D-shape and pivotably secured to opposing apertures 16, 17 along its straight side.

Recessed area 13 includes at least one opening 11 adapted to receive flexible fastener 30. The recessed area 13 is preferably deeper than the height of the portion of fastener 30 protruding from opening 11 above base plate 10. Fastener 30 is adapted to flexibly connect with anchoring member 12 by ways of threading through one or more openings 11. Fastener 30 is also adapted such that any excess length of fastener 30 protruding above the top surface of ring mount 15 can be safely cut off without compromising the connecting functionality of fastener 30. Thus, as installed on a support structure such as patio or deck, anchoring member 12 with lowered ring 20 and cut excess length of fastener 30 presents minimal protrusion profile in relation to the surface of the support structure.

Referring back to FIG. 1, holding plate 25 is preferably round and comprises at least one aperture 26 adopted to allow fastener 30 to pass through without excessive friction and without substantially limiting the range of motion of holding plate 25 prior to installing deck tie-down assembly on a support surface, e.g., deck, patio or fence.

Holding plate 25 and connected fastener 30 are adapted to allow holding plate 25 to pass through an opening in the support structure. For example, the thickness of holding plate 25 should not exceed the narrow space between two boards in deck or patio or similarly constructed structure, e.g., board fence.

Fastener 30 comprises a string-like body of sufficient length to allow securely connecting anchoring member 12 with holding plate 25. According to a preferred embodiment, fastener 30 comprises a retaining clip 35 and a strap 36 made of flexible material. Retaining clip 30 has a transverse through aperture with an integrated gear rack, while strap 36 contains a corresponding integrated gear rack. Strap 36 is adapted to pass though ring mount openings 11 and then retaining clip 35 such that after insertion the corresponding integrated gear racks engage and prevent fastener 30 from loosening once pulled tight. In addition to the preferred embodiment, the fastener 30 can include any means adapted to secure anchoring member 12 and holding plate 25 securely abutted against the surface of the support structure.

Holding plate 25 is manufactured from sufficiently strong material to satisfy the particular load requirements of the embodiment. Fastener 30 is manufactured from sturdy flexible material having sufficient tensile strength to withstand the load requirements of particular use as an anchoring device on patio deck or dock.

An alternative embodiment of the invention is illustrated in FIGS. 6-9. According to this embodiment, ring mount 15 overlaps base plate 10 and has a foot 14 extending to the line of the lower surface to the base plate 10. In this embodiment ring 20 is D-shaped and is pivotably secured within the channel formed by the base plate 10 and ring mount 15.

Figure 10:
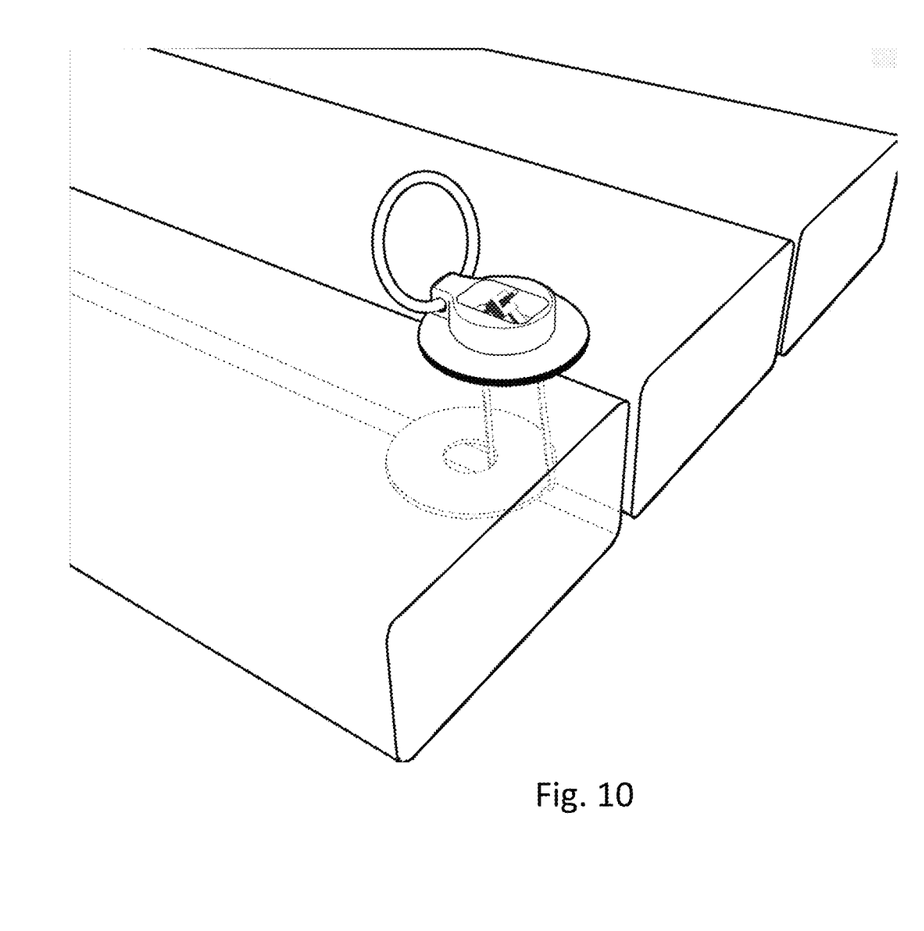
FIG. 10 is a perspective isometric view of deck tie-down assembly secured to a structure according to an embodiment of the present invention.
Figure 11:
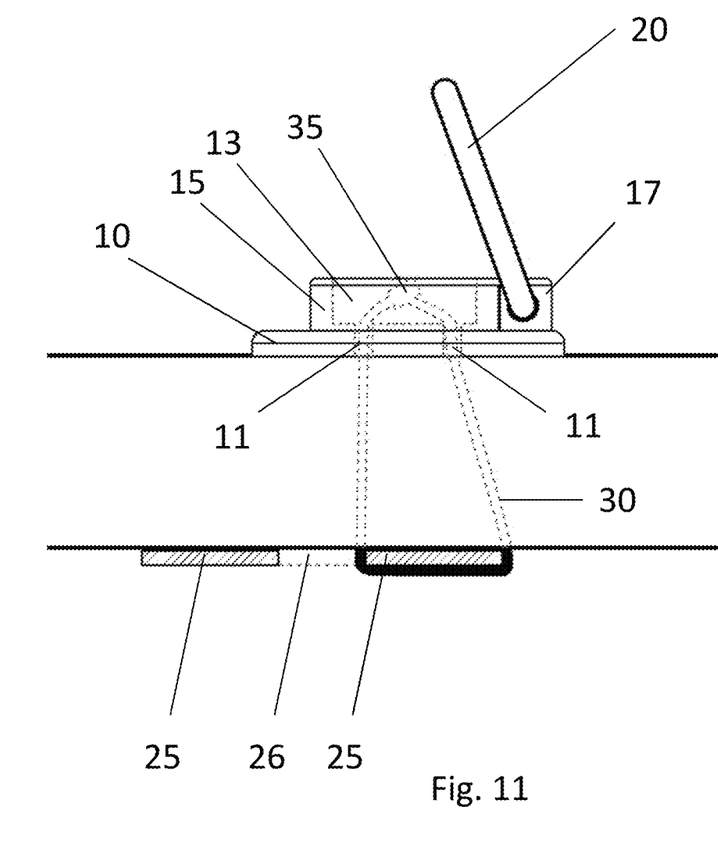
FIGS. 11 and 12 are side isometric views of deck tie-down assembly secured to a structure according to an embodiment of the present invention.
Figure 12:
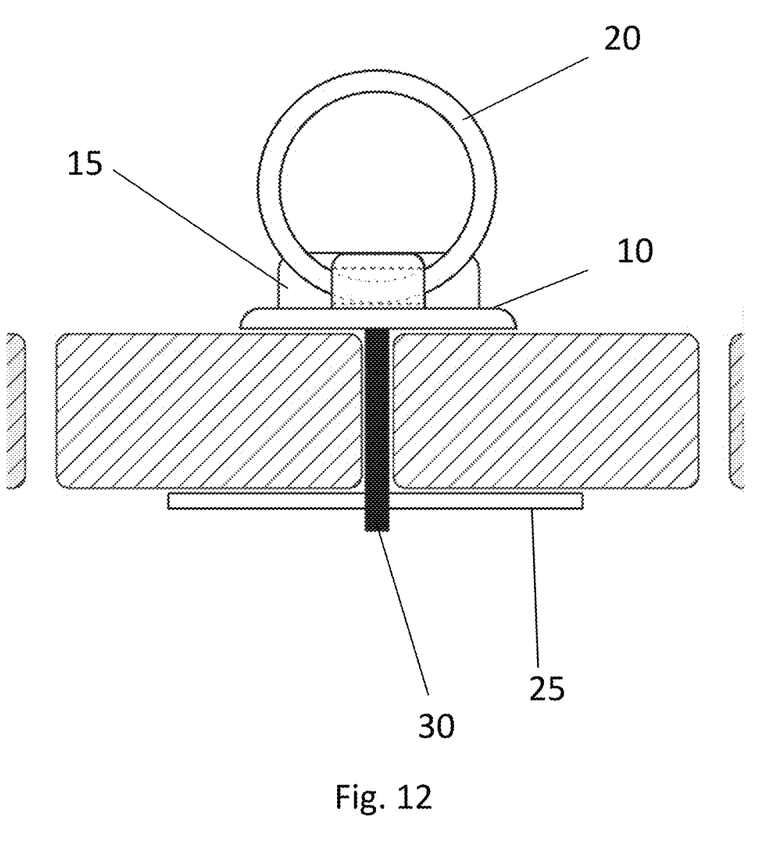

FIGS. 10-12 illustrate from various angles deck tie-down assembly 5 mounted on a support structure. The support structure is not limited to decks, docks, patios and fences, but includes any structure having opposing sides with generally parallel surfaces, also having at least one through opening capable of slideably receiving holding plate 25 along with flexible fastener 30 threaded through aperture 26. The support structure is not limited to horizontal structures such as decks, but also includes support structures with any inclination angle, including vertical structures such as fences. Furthermore, deck tie-down assembly 5 can be installed either on top or on underside surface of a support structure, such as under the decks to be used for providing hanging support. The thickness of the support structure is not limiting since a variety of flexible fasteners 30 with assortment of lengths can be provided.

Figure 13:
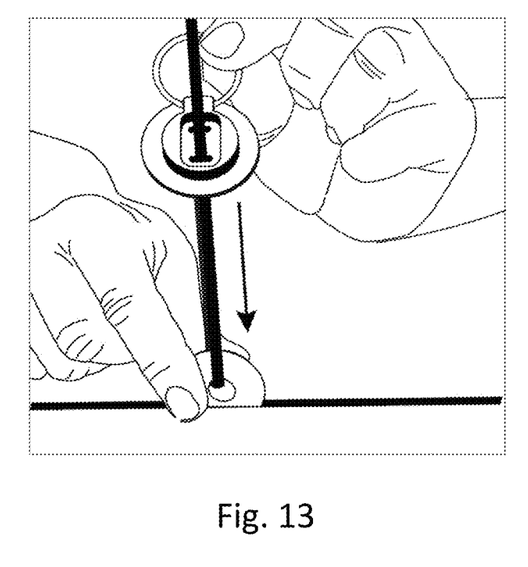
FIG. 13 illustrates the steps for installing deck tie-down assembly wherein the user slides the ring through an opening in the support structure.
Figure 14:
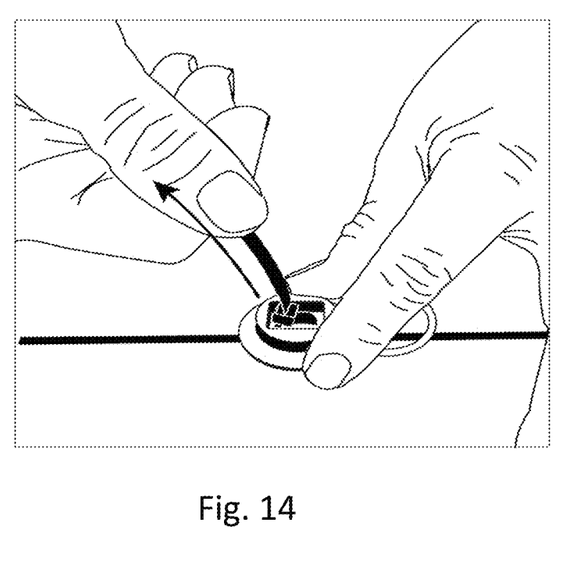
FIG. 14 illustrates the steps for installing deck tie-down assembly wherein the user pulls the connecting device upward to draw anchoring member and the holding plate tightly to the support structure.
Figure 15:
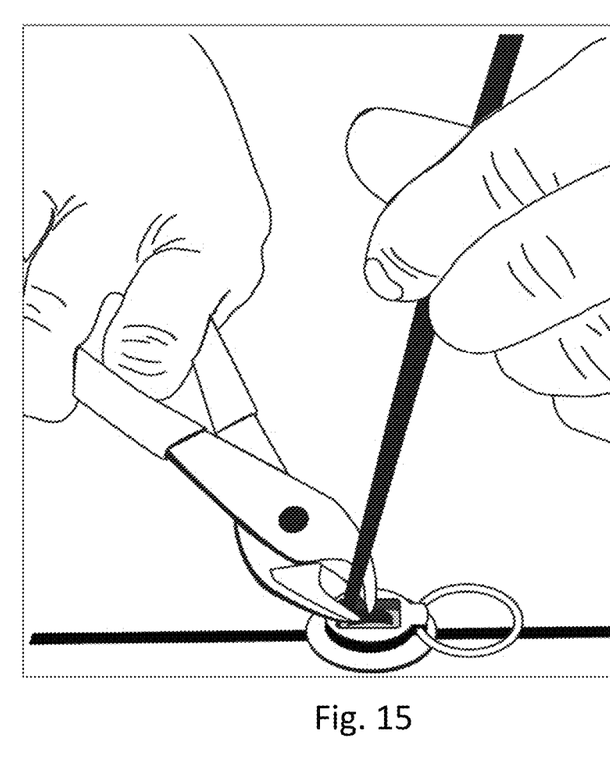
FIG. 15 illustrates the steps for installing deck tie-down assembly wherein the user cuts the connecting device above the retaining clip.

FIGS. 13-15 illustrate in more detail installation steps for an embodiment of deck tie-down assembly 5. To prepare deck tie-down assembly 5 for installation, the user first threads strap 36 through aperture 26 of holding plate 25 and through openings 11 of anchoring member 12. As shown in FIG. 13, the user then slides holding plate 25 and strap 36 through an opening in the support structure. The user inserts strap 36 through retaining clip 35 and pulls strap 36 upward. This motion urges anchoring member 12 toward holding plate 25, thus tightening the deck tie-down assembly 5 against the support structure. Secured deck tie-down assembly 5 preferably has base plate 10 and holding plate 25 fixedly abutted against surface of support structure to prohibit deck tie-down assembly 5 from moving. Finally, as illustrated in FIG. 15, the user cuts excess portion of strap 36 extending from retaining clip 35.

From the foregoing it will be seen that this invention is one well adapted to attain all ends and objectives herein-above set forth, together with the other advantages which are obvious and which are inherent to the invention.

Since many possible embodiments may be made of the invention without departing from the scope thereof, it is to be understood that all matters herein set forth are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed is:

1. An anchoring device adapted to securely attach items to a support structure, the device comprising:
    a flexible fastener comprising a flexible strap having a first end configured for insertion into a second end comprising a receiver;
    an anchoring member comprising:
        a base plate for fixedly securing the anchoring device against the front side of the support structure;
        a ring for attaching the items to the anchoring device; and
        a ring mount integrally connected to the base plate is adapted to securely connect the ring;
    a holding plate for fixedly securing the anchoring device against the back side of the support structure;
    said flexible fastener configured to be tightened by hand by pulling said first end through said receiver of said second end such that said holding plate is transferred from a first, vertical orientation perpendicular with said support structure, to a second, horizontal orientation parallel with and pressing against the back side of the support structure, thereby sandwiching the support structure between said anchoring member and said holding plate.

2. The anchoring device of claim 1, wherein an anchoring member further comprises at least one opening adapted to securely receive the flexible fastener.

3. The anchoring device of claim 2, wherein the ring mount comprises a recessed area containing the at least one opening adapted to securely receive the flexible fastener.

4. The anchoring device of claim 3, wherein the ring mount further comprises two opposing apertures for pivotably securing the ring.

5. The anchoring device of claim 4, wherein the inner circumference of the ring corresponds to the outer circumference of the ring mount such that the ring, in its lowered position, surrounds the ring mount and is adjacent to the base plate.

6. The anchoring device of claim 5, wherein the outer circumference of the ring is smaller than the outer circumference of the base plate.

7. The anchoring device of claim 3, wherein the holding plate comprises an aperture for securely receiving the flexible fastener.

8. The anchoring device of claim 1, wherein the flexible fastener comprises an integrated gear rack and retaining clip adapted to engage the gear rack thus preventing loosening of the flexible fastener.

9. The anchoring device of claim 1, wherein said holding plate comprises a washer.

\* \* \* \* \*